United States Patent [19]

Birukawa et al.

[11] Patent Number: 5,724,338
[45] Date of Patent: Mar. 3, 1998

[54] REWRITABLE DISK-SHAPED OPTICAL RECORDING MEDIUM

[75] Inventors: Masahiro Birukawa, Hirakata; Norio Miyatake, Kobe; Yuuichi Fukamachi, Ikoma; Yoshihiko Kudoh, Yawata; Yasumori Hino, Hirakata, all of Japan

[73] Assignee: Matsushita Electric Industrial Co., Ltd., Osaka-fu, Japan

[21] Appl. No.: 712,804

[22] Filed: Sep. 13, 1996

Related U.S. Application Data

[62] Division of Ser. No. 409,009, Mar. 23, 1995, which is a division of Ser. No. 118,232, Sep. 9, 1993, Pat. No. 5,422,874.

[30] Foreign Application Priority Data

Sep. 10, 1992 [JP] Japan ................................ 4-241595

[51] Int. Cl.⁶ .................................................. G11B 7/24
[52] U.S. Cl. ................................. 369/275.2; 369/275.4
[58] Field of Search ........................... 369/275.1, 275.2, 369/275.3, 275.4, 272, 13, 277, 44.37, 109, 44.26, 44.28, 44.29, 32, 100, 124

[56] References Cited

U.S. PATENT DOCUMENTS

| | | | |
|---|---|---|---|
| 4,423,502 | 12/1983 | Dil | 369/275.4 |
| 4,985,881 | 1/1991 | Saito et al. | 369/275.4 |
| 5,132,953 | 7/1992 | Matsubayashi | 369/275.1 X |
| 5,191,571 | 3/1993 | Fukumoto et al. | 369/44.37 |
| 5,214,635 | 5/1993 | Satoh et al. | 369/275.2 |
| 5,341,362 | 8/1994 | Fujii et al. | 369/275.4 |
| 5,392,263 | 2/1995 | Watanabe et al. | 369/13 |
| 5,402,411 | 3/1995 | Maeda et al. | 369/275.1 |
| 5,422,874 | 6/1995 | Birukaba et al. | 369/275.2 |

FOREIGN PATENT DOCUMENTS

| | | |
|---|---|---|
| 57-50330 | 3/1982 | Japan |
| 2-156423 | 6/1990 | Japan |
| 4-38633 | 2/1992 | Japan |

OTHER PUBLICATIONS

"Magnetic Recording", vol. 1, Technology, C. Denis Mee et al., 1987, pp. 174–179.

Primary Examiner—Ali Neyzari
Attorney, Agent, or Firm—Wenderoth, Lind & Ponack

[57] ABSTRACT

A magneto-optical recording medium includes at least a reading layer and a writing layer on a substrate. A track guide groove is formed in the medium so as to include in-groove portions and on-land portions. Only a portion where a temperature has been raised by optical beam irradiation is read, while a domain of a writing layer is copied on the writing layer, whereby a writing/reading operation can be effected with narrower track pitches. By this arrangement, there can be realized a narrow track pitch which is narrower than the diameter of a laser beam.

21 Claims, 8 Drawing Sheets

REWRITABLE DISK-SHAPED OPTICAL RECORDING MEDIUM

This application is a Rule 62 Divisional application of now abandoned application, Ser. No. 08/409,009, filed Mar. 23, 1995, which is a Rule 60 Divisional of 08/118,232, filed Sep. 9, 1993, now U.S. Pat. No. 5,422,874.

BACKGROUND OF THE INVENTION

The present invention generally relates to rewritable optical recording medium for use in the recording of information, and more particularly, to an external memory apparatus for a computer, a video and/or audio recording apparatus, a memory apparatus for game machines or the like, or a multimedia system in which these units are integrated.

In recent years, a magneto-optical disk, which is a rewritable optical recording medium, has been put into practical use as an optical recording medium capable of reading, writing, and erasing operations.

Conventionally guide grooves for guiding laser beams for recording/erasing are provided in generally used optical disks so that information to be written is adapted to be written in the above described guide grooves or among the guide grooves.

In recent years, data has become wider and, further, the demand for higher density has increased because of popularization of optical disks. A system of writing on both a guide groove (in-groove) and between-guide-grooves (on-land) for track guidance has been invented as one of the solutions. The technical contents thereof are disclosed in U.S. Pat. No. 4,423,502.

This method can realize a track pitch of ½ without reduction in tracking error signals, as the in-groove portions and the on-land portions are used as recording tracks. In a conventional system, an effect of writing signals on both the groove concave portion and the groove convex portion cannot be obtained, because cross-talk from adjacent tracks increases when a track pitch is made smaller than a beam diameter.

Concretely describing, a track pitch is limited to 1.4 μm under the influence of the cross-talk from adjacent tracks when a laser wavelength of a reading optical head is 830 nm, and 0.55 in NA (Numerical Aperture). In the optical head, it is not necessary to use both the in-groove portions and the on-land portions, because sufficient tracking error signals can be obtained if a tracking pitch of 1.4 μm is adapted to be written on on-land portions or in-groove portions only.

Generally, in the optical magneto-optical disk, a written track is divided into a plurality of sectors, and signals constituting address information are recorded in a disk manufacturing stage as pits on the head of each sector. Information about specifications of a disk, appliance setting conditions about recording/reading/erasing operations, signals necessary for servo-adjustment and so on are likewise written at a disk manufacturing stage as a signal in the form of pits.

Figure 5:
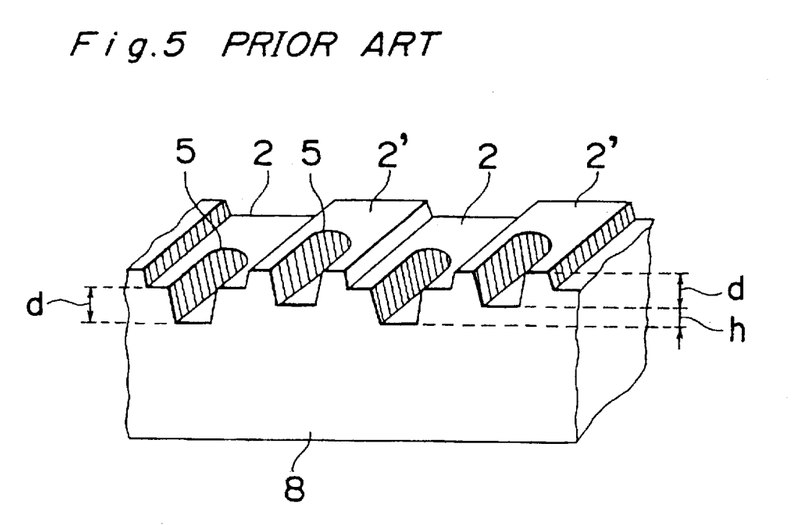
FIG. 5 is a first conventional embodiment.

According to U.S. Pat. No. 4,423,502 disclosed here, portions written as pits are adapted to form a pitch of a constant depth independently of the in-groove portions and the on-land portions as shown in FIG. 5.

A cutting operation for regulating the depth of a groove and a cutting operation for regulating the depth of a pit have to be effected separately during stamping to form such a substrate. Normally there are a method of regulating the thickness with which photoresist is applied on a master substrate, and a method of controlling exposure strength when it is laser-exposed so as to regulate the depth of the groove or pit during cutting. In forming a groove or a pit rectangular in section, the method of regulating the depth of groove or pit with photoresist thickness can be carried out stably and easily. But this method has a problem in that the depth of the groove or pit is determined in one way by the photoresist thickness so that it is extremely difficult to form pits with the same depth independently of the presence of a groove as shown in FIG. 5.

In order to solve the problem, a method is known for providing pits only in portions not connected with the groove without providing pits in the groove portion. In a method shown in FIG. 6 (Japanese Patent Laid-Open Publication No. 2-156423), the pit information of address and so on is provided within the non-groove area on the extended line of the groove and the extended line of the groove interval. Since the groove and the pit exist in different positions, the depth can be determined in one way by the photoresist thickness when the depth is made the same, thereby enabling the manufacturing operation to be effected more easily.

A switching operation between a scanning operation of the in-groove portions of the guide groove with optical beams and a scanning operation of the on-land portions with optical beams is achieved by positive and negative inverted rotation of two inputs of a differential amplifier for obtaining a tracking error signal as disclosed in Japanese Patent Laid-Open Publication No. 57-50330. That is, it is a method of switching a polarity of a tracking error signal.

Figure 6:
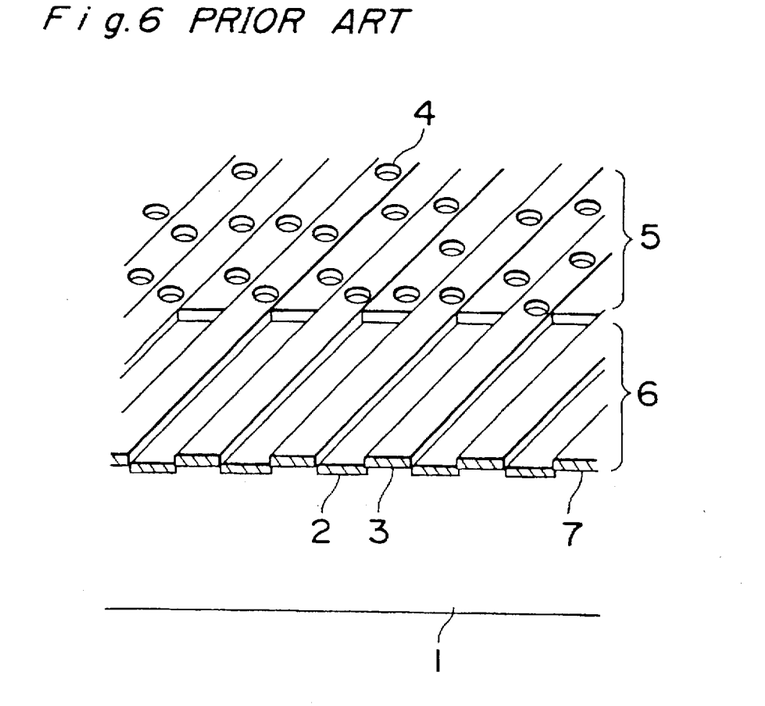
FIG. 6 is another conventional embodiment.

If the polarity of the tracking error signal is set up so as to scan the optical beams on the pits in FIG. 6, it can scan the interior of the groove by the same polarity, but cannot scan on the on-land portion.

When a tracking has been set as in the scanning operation of the on-land with the optical beams, in a disk as shown in FIG. 6, diffraction lights to be reflected from a pit portion become of a polarity opposite to an on-land portion in a pit portion provided on the extension line of the on-land, and optical beams are adapted to scan between pit strings, so that reading of pit information cannot be correctly effected.

SUMMARY OF THE INVENTION

Accordingly, an essential object of the present invention is to provide improved magneto-optical recording media which are adapted to make it possible to use convex portions and concave portions of guide grooves with the depth of a single groove and a pit to be used, and effect a recording/reading operation onto the on-land portion and a reading operation of information in the form of pits provided on the extension line in the same tracking operation mode.

Also, the present invention provides, in combination with a system for reading a signal from only a portion of a beam irradiation area against writing information so that cross-talk can be greatly reduced, a track pitch of less than a beam diameter, and the in-groove portion and on-land portion can be effectively employed as a writing track.

In accomplishing these and other objects, according to one preferred embodiment of the present invention, there are provided magneto-optical recording media including optical recording media for writing information on in-groove portions and on-land portions, and wherein:

a) a groove track is provided in which a writing area is constructed by the in-groove portions, and a land track is provided in which a writing area is constructed by the on-land portions;

b) the groove track is composed by a plurality of groove sectors, and the land track is composed by a plurality of land sectors;

c) both of the groove sectors and the land sectors are respectively composed by read-only areas which are provided by pits, and writing areas;

d) the read-only areas of the groove sectors are provided with non-groove areas;

e) the read-only areas of the land sectors are provided within land areas;

f) there are provided a reading layer consisting of at least a magnetic film, and a writing layer; and g) at least a portion of which the temperature is raised by optical beam irradiation during reading, and the domain written in the writing layer is caused to be copied onto the reading layer by exchange coupling.

As read-only information of address and so on can be formed on each of the convex portion and the concave portion of the guide groove with a depth of a single groove and a pit by the above described construction, the on-land portion and the in-groove portion of the guide grooves can be used.

A condition is realized where a tracking servo has been retracted with stability when a scanning operation has been effected on certain read only pits on the extension line in a condition where tracking alignment has been effected with respect to the in-groove portion. Further, a condition is realized where a tracking servo has been retracted with stability without causing the tracking to be unsteady even when scanning operation is effected between both the adjacent read-only pits on the extension line in a condition where the tracking alignment has been effected with respect to the on-land portion by the addition of the above described construction.

Since the cross-talk is sharply reduced by addition of the construction of g) and h) above, the on-land portion and the in-groove portion in a narrow track pitch can be used, and recording density can be considerably improved as compared with before. As a narrow track pitch can be realized, a meandering crawl operation is removed from the operation of scanning between the pits in the intermittent portions of the groove, and momentary acceleration at a location approaching the groove portion can be made smaller, thus realizing a stable tracking servo.

BRIEF DESCRIPTION OF THE DRAWINGS

These and other objects and features of the present invention will become apparent from the following description of the preferred embodiments thereof with reference to the accompanying drawings, in which.

DESCRIPTION OF THE PREFERRED EMBODIMENTS

Before the description of the present invention proceeds, it is to be noted that like parts are designated by like reference numerals throughout the accompanying drawings.

One embodiment of the present invention will be described hereinafter with reference to the drawings.

Figure 1A:
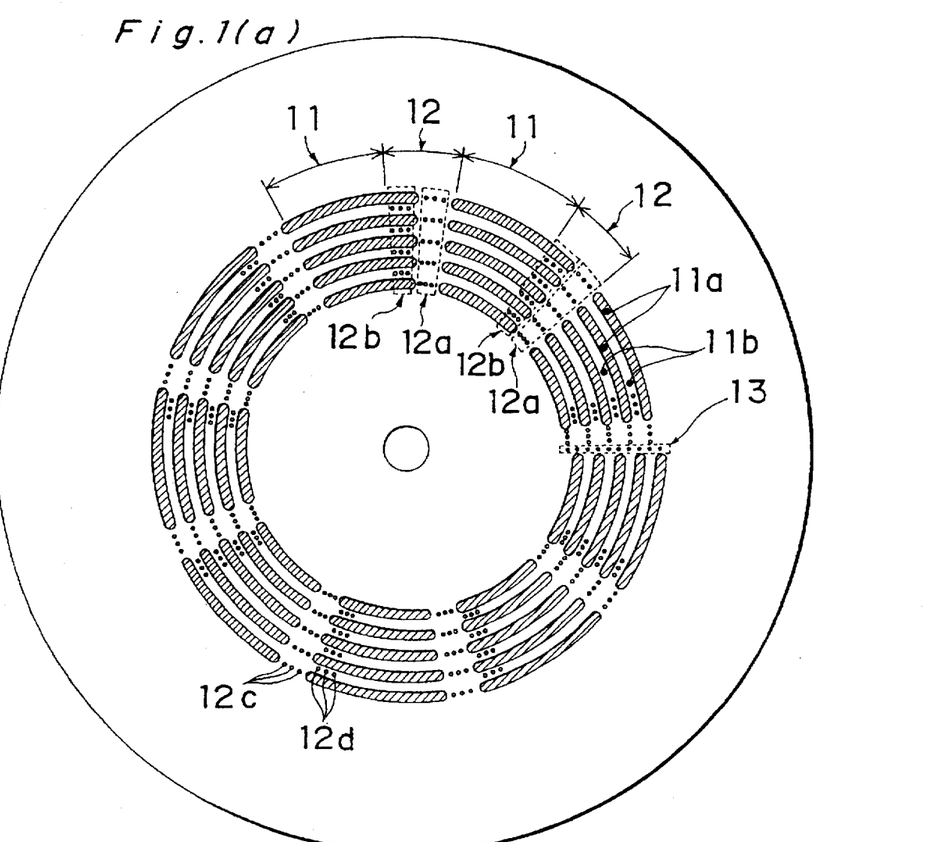
FIGS. 1(a) and 1(b) are views of a recording medium in a first embodiment of the present invention.
Figure 1B:
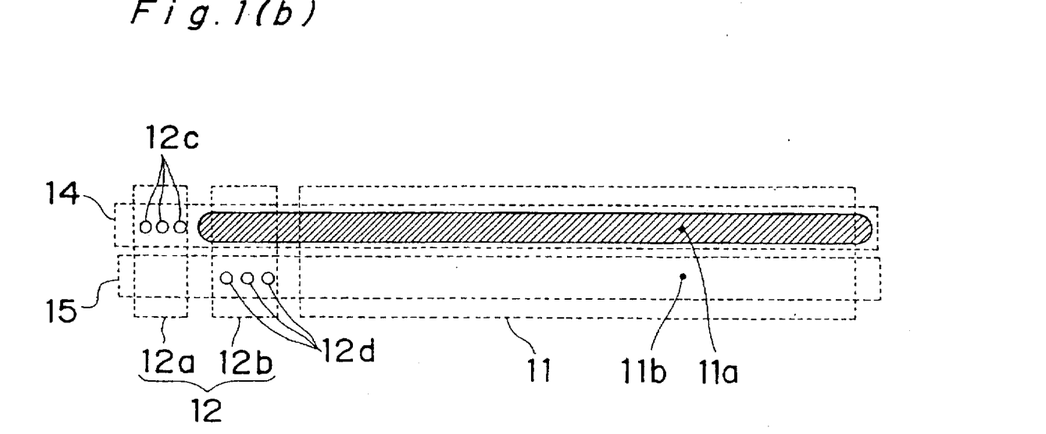

FIG. 1(a) shows a plan view of a magneto-optical recording medium and FIG. 1(b) shows a construction of two sectors (or sector portions) adjoined with each other. This two-sector construction includes a writing area 11 including an in-groove portion (or groove area) 11a and an on-land portion (non-groove area) 11b, a read-only area 12 consisting of pits including first pits 12c provided in a non-groove area 12a wherein there is in-groove portion, and second pits 12d provided in the on-land portion, and a discrimination part 13 for changing the tracking polarities and provided as read-only information pits.

As shown in FIGS. 1(a) and 1(b), one writing area 11 of a groove track which is provided within the in-groove portion 11a, and the other writing area of a land track which is provided within the on-land portion 11b, are located adjacent each other. The groove track consists of a plurality of groove sectors (or groove sector portions) 14 each having a non-groove area 12a at a top end thereof provided with first pits 12c including a groove sector address, while the land track consists of a plurality of land sectors (or land sector portions) 15 each having a land pit area 12b provided with second pits 12d including a land sector address.

When optical beams are scanned in the counter clockwise direction along the track from the starting point of some groove sector, the optical beams reach within one revolution the land sector adjoined to the groove sector relating to the starting point so that the in-groove portion and the on-land portion are adapted to alternate with each other every revolution. The discrimination part for changing the tracking polarities is provided at the position where the groove track alternates with the land track.

Even in a disk-shaped optical recording medium using the in-groove portion and the on-land portion, the following effects can be obtained.

a) a cutting operation can be effected with one beam while the optical beam is being moved steadily in a radial direction of a master substrate during the rotation of the master substrate, and b) data can be continuously written sequentially, without a track jumping operation, from an inner periphery or an outer periphery.

Figure 2:
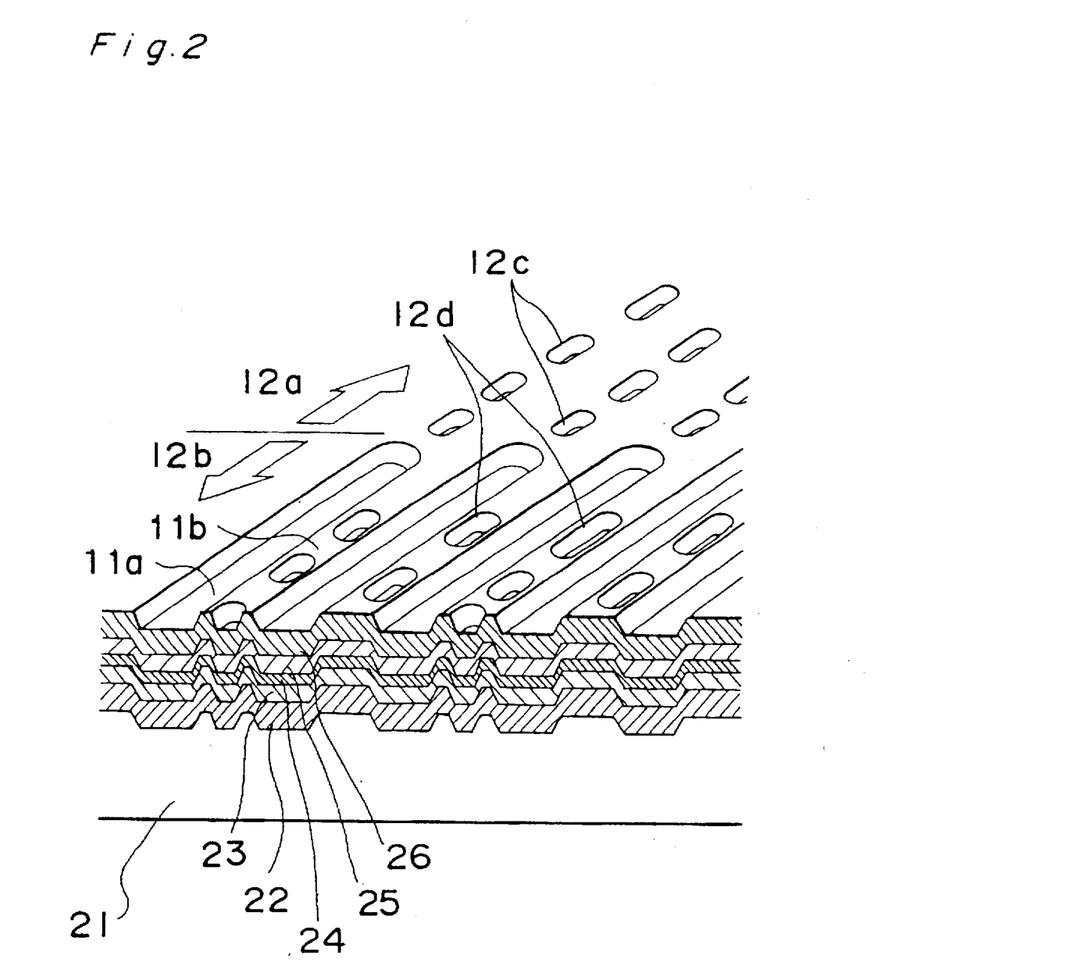
FIG. 2 is a construction view of a magneto-optical recording medium showing a positional relation between guide grooves and pits in the first embodiment of the present invention.

FIG. 2 is a partially enlarged view taken from the non-groove area 12a to the land pit area 12b, wherein the pits 12d of the on-land pit area 12b are provided within the on-land portion 11b, and the pits of non-groove area 12a are provided within the area where no guide grooves are present. The widths of the in-groove portions and the on-land portions are 0.8 µm, respectively, and the depths of grooves are 70 nm. Also, read-only information pits 12c and 12d have the same depths as the grooves.

The medium is formed of laminated layers including, in order, an enhanced layer 22, a reading layer 23, a controlling layer for exchange coupling 24, a writing layer 25, a protection layer 26, all formed on a substrate 21 provided with guide grooves and pits.

Figure 3:
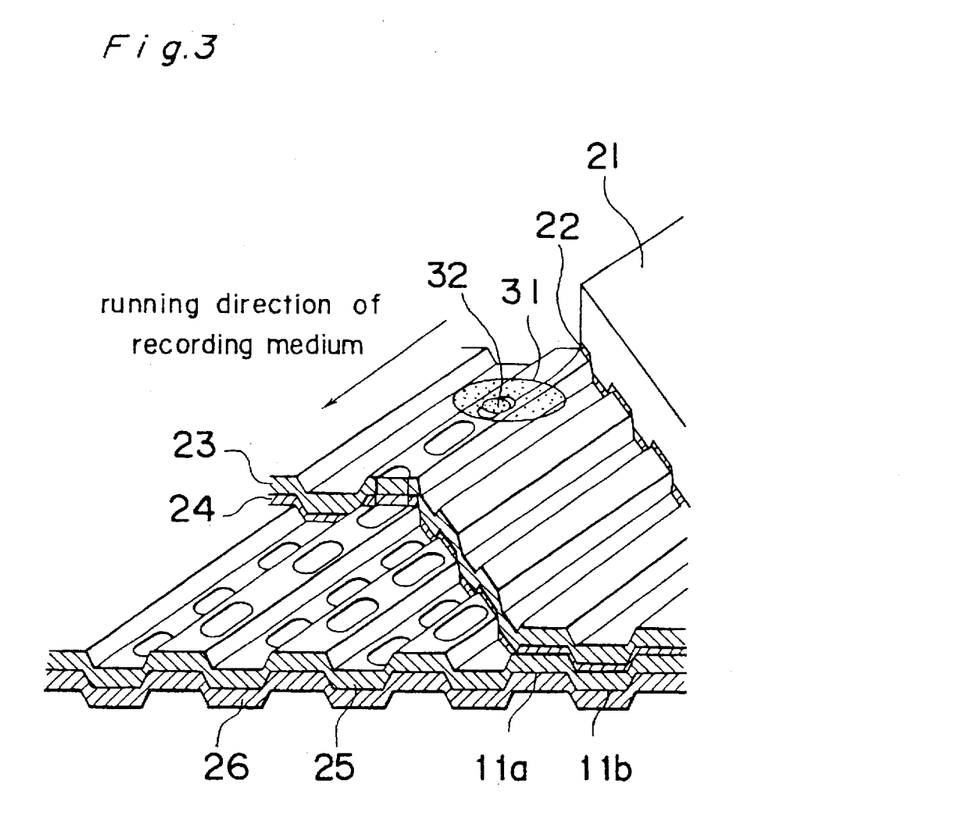
FIG. 3 is a construction view of a data writing portion in the first embodiment of the present invention.

FIG. 3 is a partially enlarged view of a writing area 11 of the magneto-optical recording medium shown in FIG. 1. Guide grooves are formed throughout the writing area 11. In FIG. 3, reference numeral 11a is the in-groove portion, reference numeral 11b is the on-land portion, reference numeral 23 is the reading layer, reference numeral 24 is the controlling layer, reference number 25 is the writing layer, reference numeral 31 depicts an area irradiated by a laser beam, and reference numeral 32 depicts a copies area of written domain.

In FIG. 2, laser beams for recording/erasing operations are projected from below. In FIG. 3, they are irradiated from above.

The magneto-optical recording medium constructed as hereinabove will be described hereinafter in its operation with the use of FIG. 2 and FIG. 3.

When a tracking alignment is effected for guide grooves, a two-part detector is used to obtain a tracking error signal. A direction for moving beams with respect to the unbalanced size relation of each light intensity to the two-part detector is the same between a case where optical beams are scanned on the in-groove portion of the tracking guide groove and a case where optical beams are scanned on pit strings. When a polarity is input to a differential amplifier for obtaining a tracking error signal, optical beams are scanned on the on-land portion of the grooves in an area where guide grooves are formed and optical beams are scanned between right and left pit strings in an area where pit strings are formed.

When the optical beams have moved to a first pit area 12c where guide grooves are not formed from an on-land portion pit area 12b where guide grooves are formed, with a tracking servo condition when optical beams are scanned on the in-groove portion 11a in FIG. 2 being retained, a smooth operation is effected in the same tracking servo condition to move the optical beams from the pits of the non-groove area 12a to the in-groove portion 11a of the on-land portion pit area 12b. Immediately after information formed by pits has been loaded, a recording/reading operation or an erasing operation of the in-groove concave portion (data portion) can be effected with ease.

In FIG. 2, when the optical beams have moved from a second pit area where guide grooves are formed to a first pit area (i.e., the non-groove are 12a where guide grooves are not formed), with a tracking servo condition being retained when the on-land portions 11b are scanned with optical beams, track-on can be effected on the on-land portion 11b as the grooves are formed independently of the presence of the pits in the second pit area, i.e., the on-land portion pit area 12b. Laser beams are adapted to be scanned among pit strings formed on the right and left tracks as pits are not formed in the second pit area 12c existing on the extension line. Even in this case, immediately after information formed by pits 12d provided on the on-land portion has been loaded in the same tracking servo condition, a recording/reading operation or an erasing operation of the on-land portion (data portion) can be effected with ease.

In this system, a condition where tracking is placed into a groove and a condition where a tracking is retracted from between the grooves are switched each time an identifier for switching the tracking polarity is detected.

Disks of various track pitches Tp can be made by the construction of the above described magneto-optical disk.

Cross-talk quantity with respect to each disk is estimated by simulation, because pits are carved only in one portion for one rotation of the disk. A case is assumed where pit width is approximately 0.4 µm as in actual production, and a constant frequency of 1.0 µm is repeated and recorded for each pit string. Cross-talk quantity with respect to various Tp is estimated to be 0.4 µm≦TP≦1.2 µm, where the in-groove portion and the on-land portion are respectively the same in width, and the width is made a track pitch Tp. Simulation results of the cross-talk among pit strings in the first pit area are shown in the following table. An optical source wavelength λ is 830 nm, and NA (Numerical Aperture) is 0.55. Reference character A shows a track pitch with respect to a diameter of a laser beam from erasing. It is a numerical value defined by A=Tp/(λ/NA).

| Tp | A | cross-talk | (measured value) |
|---|---|---|---|
| 1.2 µm | 0.795 | >−40 db | |
| 1.0 µm | 0.663 | >−40 db | |
| 0.8 µm | 0.530 | >−40 db | |
| 0.6 µm | 0.398 | >−40 db | |
| 0.4 µm | 0.265 | >−18 db | |

As clear from the results, it is found that the cross-talk amount is sufficiently small without hindrance in practical use if Tp is 0.6 µm or more, and is 0.4 or more at the value of A. The cross-talk is required to be restrained to −25 dB or lower, because 5% or so of a data window is desirable as a top limit of jitter addition by the cross-talk. In accordance with the above described results, Tp is required to be at least 0.6 µm or more, and 0.4 or more in the converted value of A.

When the Tp is expanded, a momentary acceleration occurs in moving from the area 12a to the on-land portion pit area 12b when optical beams have been scanned from between the pit strings of the non-groove area 12a on the extension line of the on-land portion to the area of the on-land portion 12b. With a Tp of 1.2 µm, the tracking servo is not stable in this portion so that it cannot be used. When the optical beams have been scanned among the pit strings of the area 12b, the pit string intervals become wider and the optical beams crawl meanderingly so that the optical beams do not pass necessarily through the center between the pit strings. They are forced to be brought back to the center of the on-land portion at a location approaching the area 12a.

The Tp is required to be 1.0 µm or lower at maximum and 0.7 or lower in the converted value of A.

Recording/reading results with respect to the writing area 11 where pits are not provided will be described hereinafter. First, a reading method will be described. Written domains are formed on both the in-groove portion 11a of the groove and the on-land portion 11b of the groove in the writing layer 25 composed of TbFeCo as shown in FIG. 2. The controlling layer 24 composed of GdFeCo forms a stable magnetic wall between the writing layer 25 and the reading layer 23 at room temperature so as to further positively copy a domain formed on the writing layer 25 onto reading layer 23 when the temperature is rising due to power irradiation, which is not always essential. A domain once copied on the reading layer 23 is directed in one direction only in the reading layer by an external magnetic field provided in a completely different location from the optical beams. A domain of only a temperature-raised portion where beams are irradiated is made sympathetic so as to contribute towards the reading operation as shown in FIG. 2 during reading.

If the track pitch becomes equal to or less than a beam diameter when information is written only on the normal in-groove portion or only on the on-land portion, a tracking error signal also becomes smaller. When an expression is effected with the use of the value of the above described A, A>0.7 is required to realize the stable tracking servo. In the reading methods, the cross-talk quantity can be made sufficiently smaller even with respect to the narrow track pitch and can be used sufficiently if the value of A is 0.7 or lower, because a transfer area for contributing towards the signal reading is restricted to a small area with respect to the area irradiated by laser beams. In the present reading system, the value of A can be made 0.7 or lower for the first time by the use of both the in-groove portion and the on-land portion of the grooves as writing tracks.

A recording/reading operation is effected with a frequency equivalent to 0.5 µm in domain length with respect to an area where grooves are not provided at all so as to measure cross-talk while shifting the reading beams little by little from the written track. The measured results of the track shift amount and the cross-talk are shown in the following table.

| Track Shift Amount | Cross-talk |
| --- | --- |
| 1.2 µm | impossible to measure (minimal) |
| 1.0 µm | impossible to measure (minimal) |
| 0.8 µm | impossible to measure (minimal) |
| 0.6 µm | −35 dB |
| 0.4 µm | −15 dB |

As clear from the results, it is found that it can be used even if the reading beam is shifted by 0.6 µm or more with respect to the writing track by the adoption of a reading mechanism for reading while a domain written on the writing layer is being copied on the reading layer by the exchange coupling of only a portion where the temperature is raised by the optical beam irradiation during reading. There are at least a reading layer and a writing layer. The reading layer can be used with a track pitch of 0.6 µm or more, namely, 0.4 or more in the converted value of A. The value conforms to the width of the area where the magnetization of the writing layer during reading is copied on the reading layer. The Tp is required to be wider than the width of the area where the magnetization of the writing layer is copied on the reading layer during reading.

In accordance with the present embodiment, a track pitch of 1 µm or less can be realized by the use of the in-groove portion and the on-land portion of the guide grooves, so that the recording density can be increased remarkably.

It is noted that the present invention is not limited to the above-mentioned reading system, and can be applied to a system of magnetically induced super resolution for reading by exchange coupling a part of which is raised in temperature when an optical beam is irradiated under at least a reading layer and a writing layer so that it is especially effective to make the track pitch of the writing area small, as shown in M. KANEKO et al. "Multilayered Magneto-Optical Disk for Magnetically Induced Superresolution" JJAP Series 6, Proc. Int. Symo, on Optical Memory, 1991, pp. 203–210.

A second embodiment of the present invention will be described hereinafter with reference to the drawings.

Figure 4:
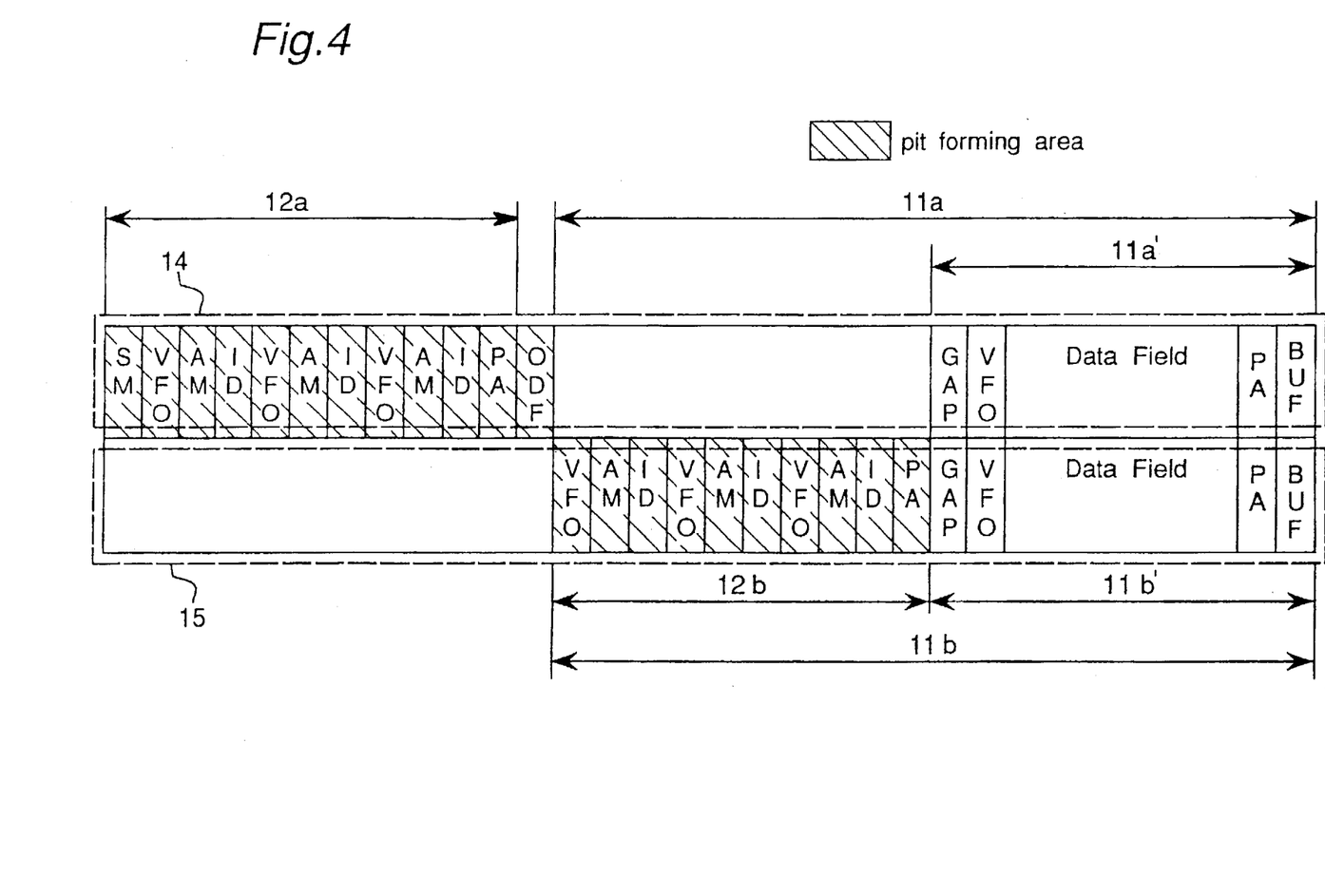
FIG. 4 is a construction view of a sector in a second embodiment of the present invention.

FIG. 4 shows two adjacent sector structures in a second embodiment of the present invention, including a groove sector 14 at an upper stage and a land sector 15 at lower stage. The upper stage of groove sector 14 is composed of the writing area 11a' of a guide in-groove portion 11a and pits 12c provided in the non-groove area 12a on the extension line. A header area to be constructed by pit strings 12c is composed of a sector mark (SM), a first VFO area (VFO), a first address mark (AM), a first ID area (ID), a second VFO area (VFO), a second address mark (AM), a second ID area (ID), a third VFO area (VFO), a third address mark (AM), a third ID address (ID), and a post-amble (PA). Here, only pits exist; guide grooves do not exist. The structure is composed of fifty-two bytes in total, and is completely the same as the ISO standard for a rewritable type optical disk cartridge except for the guide grooves. A one-byte off-set detection area (ODF), where pits do not exist, is present adjacent the non-groove area 12a, and the in-groove portion 11a continues thereafter. An area which is not used is provided in the head portion of the in-groove portion, and the writing area 11a' of a magneto-optical signal is present thereafter.

The lower stage is composed of a guide on-land portion and pit string intervals provided on the extension line, but does not use the pit string intervals of non-groove area 12a. A header area composed of pit strings is provided in the header portion of the guide on-land portion. The header area is composed of a first VFO area (VFO), a first address mark (AM), a first ID area (ID), a second VFO area (VFO), a second address mark (AM), a second ID area (ID), a third VFO area (VFO), a third address mark (AM), a third ID area (ID), and a post-amble (PA). A guide in-groove portion exists on both sides of the pit strings. The construction is composed of forty-seven bytes in total and is completely the same as the ISO standard for a rewritable type of optical disk cartridge except for the sector mark. In succession to this, the in-groove portion 11a is continued after an off-set detecting area (ODF) of one byte in which pits and grooves are not present. A groove on-land portion where pits do not exist is continues to it and a writing area 11a' of the magneto-optical signal exists. These writing areas are common in both the sector of the guide on-land portion and the sector of the guide in-groove portion, and are composed of a non-use area (GAP), a VFO area (VFO), a data area (Data Field), a post-amble (PA), and a buffer area (BUF). These structures are composed of six hundred seventy-two bytes in total and are completely the same as the ISO standard for a rewritable type disk cartridge. An interval between adjacent pit strings becomes approximately twice that of adjacent magneto-optical signal strings. An effect capable of narrowing the track pitch is adapted to be exhibited sufficiently in a magneto-optical signal reading area (domain copying area) which is restricted to an area much narrower than the beam irradiation area with respect to the pit signal area that the whole irradiated area of laser beams contributes towards the signal reading operation.

The pit portion is 0.78 µm, and the data portion is 0.47 µm in the shortest mark length in either of the groove sector and the land sector. A magneto-optical disk having such sector construction, includes a writing film which is completely the same as shown in FIG. 2. A disk diameter is 3.5 inches, and a writing area is 24 mm through 40 mm in radius. The total number of the tracks in the writing area is 20,000 with 0.8 µm in track pitch. The number of the sectors per track is 36 sectors. 512 bytes are provided per sector. A total memory capacity per disk is 368 megabytes, which is approximately three times the conventional 128 megabytes.

Data recorded across all the sectors except for a minimum amount of faulty sectors can be read faithfully with a result that a recording/reading operation is effected with the use of such a disk.

As a track pitch of 1 µm or lower can be realized by the use of the guide in-groove portion and the on-land portion in accordance with the present embodiment, the recording density can be remarkably increased.

Although read-only signals from pits are provided in the embodiment of the present invention, header signals such as addresses and so on can be formed with magnetic signals, and do not especially have to be pits. In this case, it is effective that continuous guide grooves are formed across the whole face of the disk, magnetic films shown in FIG. 2 or FIG. 3 are composed, and both the guide in-groove portion and the guide on-land portion are used as in the data portion of the embodiment. As the momentary acceleration in the direction of the tracking has no problem in this case, it is effective in the range of at least $0.4 \leq A \leq 0.7$ in $$Tp=A \times (\lambda / NA)$$

as clear from the first embodiment as well as the second embodiment.

Although no pits are formed in the non-groove area 12a on the extension line of the on-land portion of the guide groove in the first embodiment, pits may exist between right and left pit strings if pits are provided in small enough numbers for the tracking servo to become stable. In this case, in order to prevent the tracking servo from becoming unsteady, it is necessary to have, over 1/2000 or lower of track circumference in length, the information amount of minimum quantity of approximately 10 bytes or lower in the converted information quantity.

Figure 7:
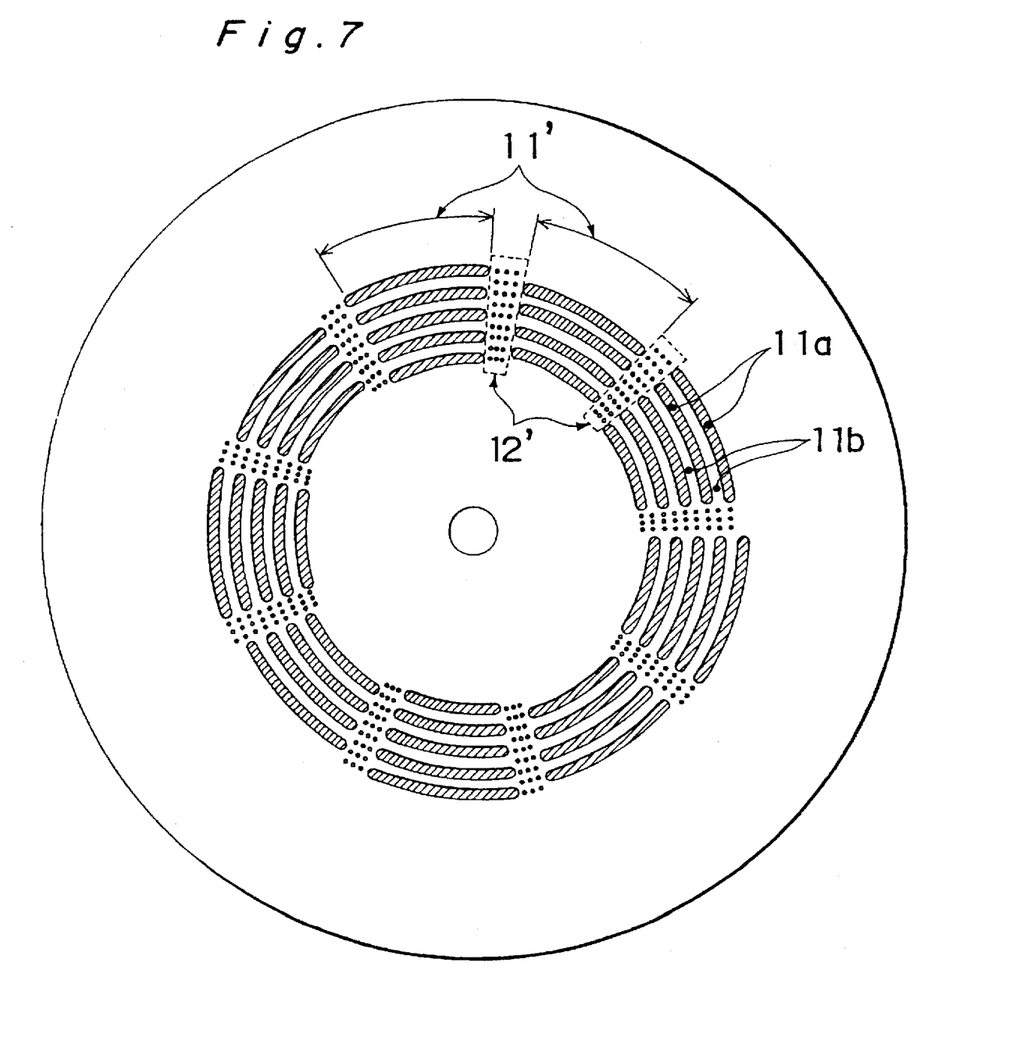
FIG. 7 is a construction view of a writing medium in a third embodiment of the present invention.

A disk of the construction shown in FIG. 7 is an example of a third embodiment of the present invention. In FIG. 7, the writing area 11' includes a groove sector consisting of an in-groove portion 11a and a land sector consisting of an on-land portion 11b, and has read-only areas 12' consisting of bits less than 10 bytes at the front heads of the respective sectors. When optical beams are scanned in a counter-clockwise direction on a track with a certain groove sector as a starting point, an in-groove portion and an on-land portion are adapted to be alternated each time they pass through the land sector, group sector, land sector and so on and a read-only information portion 12' of ten bytes or less. After one rotation, they reach an on-land portion adjacent to the groove portion as a starting point and the in-groove portion and the on-land portion are adapted to be alternated for each rotation. In order to realize such construction, it is necessary to divide a track of one rotation into odd-numbered regions. As in an optical recording medium having a spiral type groove using only the conventional in-groove portion or on-land portion, and even in a disk-shaped optical recording medium using the in-groove portion and an on-land portion, effects are obtained in that a) a cutting operation can be effected with one beam while moving the optical beams stationarily in a radial direction of a master substrate during the rotation of the disk master substrate, and b) data can be continuously recorded sequentially, without a track jumping operation, from an inner periphery or an outer periphery.

Figure 8:
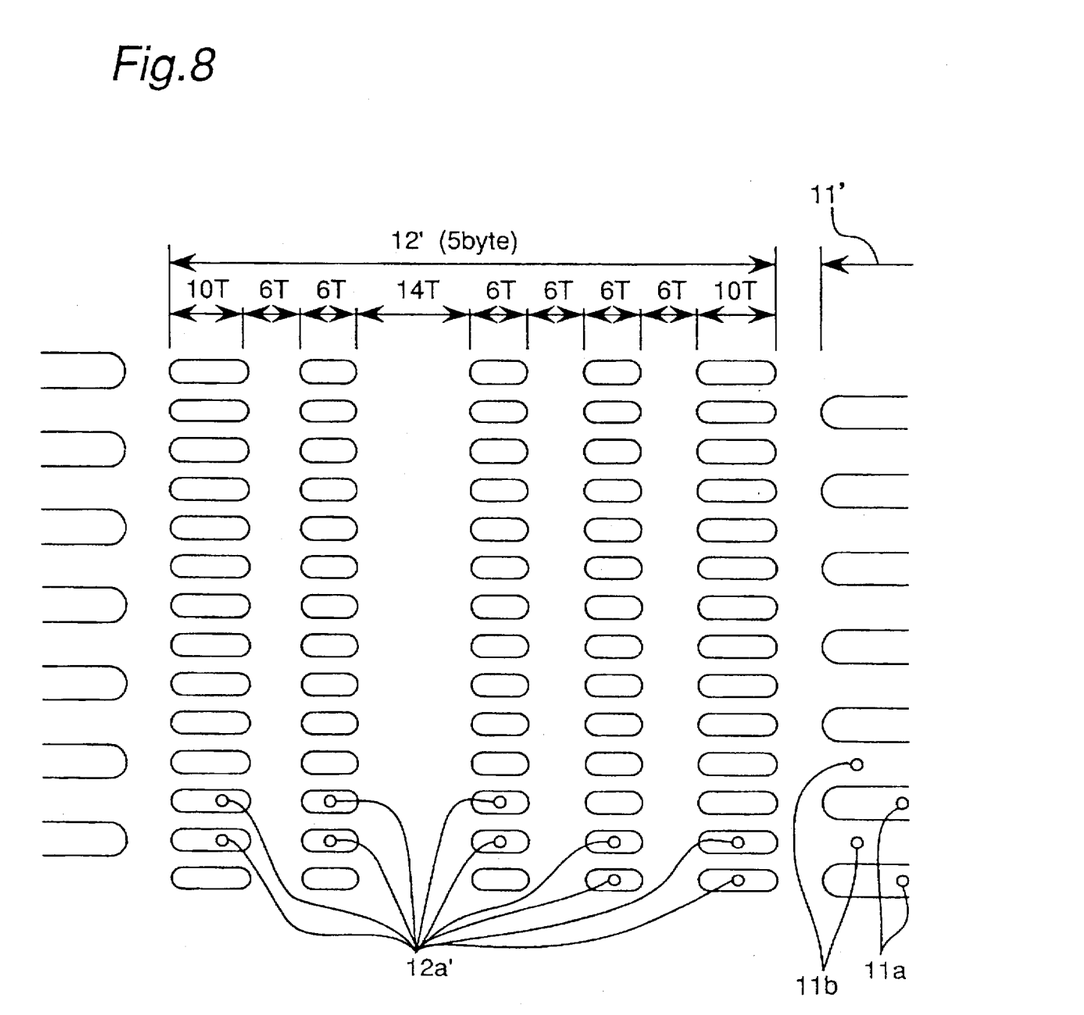
FIG. 8 is a construction view showing a pit portion of the writing medium in the third embodiment of the present invention.

A read-only information portion 12' of ten bytes or less is composed as shown in FIG. 8 in a structural model. The read-only information portion 12' is a sector mark of five bytes and the same information is recorded in all the sectors independently of the in-groove portion and the on-land portion. Sector marks in FIG. 8 are patterns of 10T, 6T, 6T, 14T, 6T, 6T, 6T, 6T, 10T to provide the pits in the ISO standard.

A film structure of a recording film is similar to that shown in FIG. 2. Groove width and track pitch are both 0.8 μm and the groove depth is 40 nm.

Figure 9:
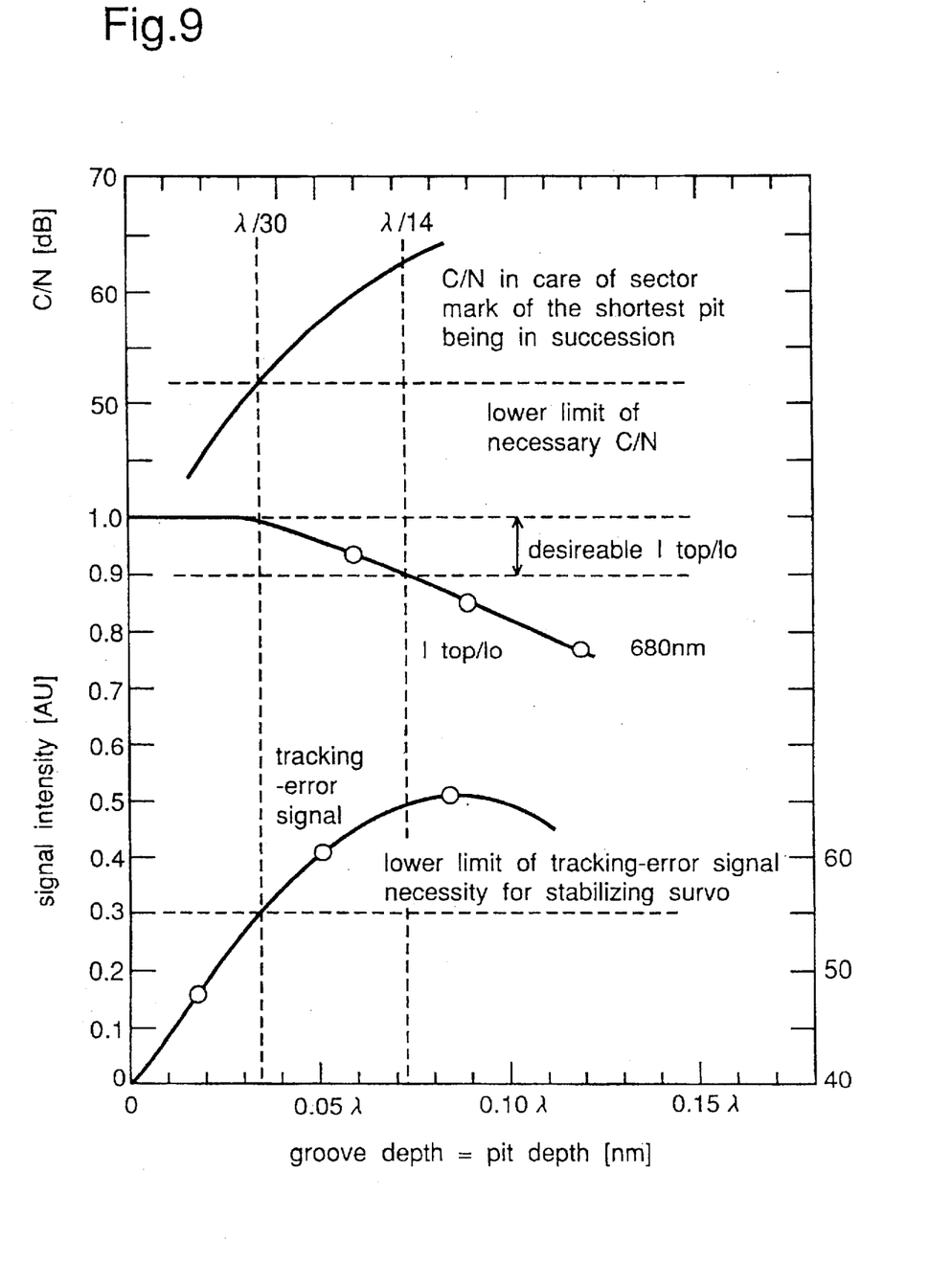
FIG. 9 is a graph showing a relationship between effective groove depth and groove depth of embodiments of the present invention.

FIG. 9 shows the relationship of groove depth, tracking error signal and I top/Io. The I top/Io is a ratio of reflection beam intensity I top from the on-land with respect to the reflection beam intensity Io from a portion having no grooves, and is stipulated to be 0.7 or more in an ISO standard so as to retain the quality of magneto-optical signal. It is preferably 0.9 or more when noises or the like caused by scattered beams from the groove oblique faces have been taken into consideration. Therefore, the groove depth is preferably at least 2/14 or lower, where $\lambda$ represents the wavelength of the laser beam. Groove depth of $\lambda/30$ or more is required so as to stably operate the tracking. The groove depth is preferably $\lambda/30$ or more and $\lambda/14$ or lower so as to make the stability of the tracking compatible with the quality of magneto-optical signal.

When the groove is made shallower like this, the depth of the pit likewise becomes shallower, which badly influences the quality of the pit signal. In the present embodiment, a read-only information area to be provided as pits are sector marks only showing the starts of the sectors. They have no problems in signal quality, because they are pits four times or more longer than signals of the first VFO area (VFO), the first address mark (AM), the first ID area (ID), the second VFO area (VFO), the second address mark (AM), the second ID area (ID), the third VFO area (VFO), the third address mark (AM), the third ID area (ID), the post-amble (PA) or the like shown in the second embodiment. This means that the address can be made to have a length of bits longer than at least four times that of the shortest bit in the case of providing an address with bits, to thereby not cause any problems in the quality of signals. As clear from FIG. 9, it is found out that the groove depth can be sufficiently used, because C/N52 dB or more is obtained if the groove depth is a repetition of 6T which is the shortest pit length of the sector mark.

In the present embodiment, pits are disposed in side by side positions with respect to adjacent tracks as shown in FIG. 8, unlike the first embodiment. As the arranged pits are in the same pattern with respect to adjacent tracks, cross-talk is not a problem.

In addition, sector marks provided with the pits can be used as a sector start signal and can be used as identifiers for switching the polarity of the tracking. An identifier for switching the polarity of the tracking is not required to be used anew as in the first embodiment.

As an address necessary for identification of each sector is loaded together with data during writing, it can be written and read under the same conditions as a data portion shown in the first embodiment, because a system for reading only one portion of the beam spot is used.

In the present embodiment, a blank portion (area not used) of the adjacent track portion of the pit area shown in FIG. 4 is removed to further increase memory capacity.

The present invention is effective not only in either of optical modulation recording and magnetic field modulation recording, but also in all optical disks using both the in-groove portion and the on-land portion. Also, the present embodiment is adapted as a super resolution reading system of optical magnetic type as a writing and reading system for providing a narrow track pitch, but can be applied effectively to writing plus other types such as a relative variation writing medium employing an in-groove portion and an on-land portion as a writing track together with pit information.

In the present embodiment, a CAV system is adopted. A recording capacity can be further made larger by the joint use of a ZCAV system and a CAV system.

As is clear from the foregoing description, the present invention can write and read on both the guide in-groove portion and the guide on-land portion with 1 μm or less in track pitch by the construction where at least a reading layer and a writing layer are provided, magnetization of the reading layer of a portion where optical beams are not irradiated is directed in one direction, and only a portion where temperature has been raised by optical beam irradiation during reading is read by exchange coupling while a domain written on a writing layer is being copied on the reading layer. A read-only information from pits is adapted to be formed a) on both a portion where guide grooves on the extension line of an in-groove portion of the track guide groove does not exist, and b) an on-land portion grasped in the in-groove portion of the track guide groove, and c) hardly exists on a portion where guide grooves on the extension line in an on-land portion of the track guide groove do not exist. Cross-talk between pits can be lowered in a range of a track pitch Tp, where $$Tp = A \times (\lambda/NA),$$

where $0.4 \leq A \leq 0.7$ and the tracking servo can be stably operated. Therefore, the read-only information in the form of pits, and magneto-optical signals can be used jointly even in the narrow track pitch, and higher density such as addition of address signal, partial ROM or the like can be realized, thus providing superior magneto-optical recording medium.

The present invention is to provide a tracking servo which is stable upon coexisting a reading special information and writing information on the employment of an in-groove portion and an on-land portion with a track pitch of less than 1 μm, and wherein:

a) the in-groove portion includes a groove track for writing a group of writing and reading information, and the on-land portion includes a land track for writing a group of writing and reading information, b) the groove track includes a plurality of groove sectors, and the land track includes a plurality of land sectors, c) both of the groove sectors and land sectors are respectively consisted of a read-only area including a pit and a group of writing and reading information to be written by laser on the employment of a rewritable film, d) the read-only area of group sector is provided within the non-group area, e) the read-only area of land sector is provided within the land area, f) a writing film includes a reading layer consisting of at least magnetic film, and a writing layer, g) the domain written in the writing layer is designed to read in copying into the reading layer through the exchanging coupling at at least a part of a portion of which temperature is raised by optical beam irradiation during reading.

In addition, in the tracing servo of the present invention:

a) the track of one round is divided into an odd number of sectors, b) the in-groove portions and on-land portions are alternated each sector in the case of the optical beam being scanned along the track, c) when the optical beam is scanned by one revolution on the track from the starting point of in-groove portion of a certain track, the optical beam reaches the on-land portion adjoined to the in-groove portion of the starting point after running along a spiral string of intermittent grooves provided on the tracking servo, d) the read-only area provided on a form of pit is provided at the front head of the respective sector, e) the read-only area is provided with the same pattern between the adjacent tracks, and f) the read-only area of one piece is designed with a length of less than 1/2000 of the circumference of the track.

With the above construction of the present invention, an optical recording medium can be provided with grooves and pits of equal depth, which are shallower than in the prior art, whereby the groove noise can be reduced, and the quality of optical magnetic signal can be improved. At the same time, the read-only area can be employed as a discrimination piece for showing the starting point of a sector, as well as a discrimination piece for changing the tracking polarities, so that it is not necessary to provide separately a discrimination piece for changing the tracking polarities. Also, as each reading information group is constructed by the same pattern of grooves, the signals can not be inferior due to cross-talk. Also, since, in the case of scanning on the pits at the state of fitting in the tracking to the on-land portion, the read-only area is small in size (i.e. less than 1/2000 of track circumference), whereby the tracking servo can be taken in a stable condition without causing kicking off of the tracking.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A rewritable disk-shaped optical recording medium, comprising:

a track having a plurality of turns, each of which is divided into a plurality of sector portions;

wherein a first plurality of said sector portions comprises land sector portions and a second plurality of said sector portions comprises groove sector portions;

wherein said land sector portions and said groove sector portions are alternatingly provided along a radial direction;

wherein each of said groove sector portions comprises a groove area and a non-groove area, and each of said land sector portions comprises a land constituting a non-groove area;

wherein each of said land sector portions includes a first read-only area comprising first pits, and a first rewriting area for recording and reading of data;

wherein each of said groove sector portions includes a second read-only area comprising second pits, and a second rewriting area for recording and reading of data;

wherein said second read-only area of each of said groove sector portions is formed in said non-groove area thereof;

wherein said first read-only area of each of said land sector portions is formed in said non-groove area thereof; and wherein the pits of the first and second read-only areas of each adjacent pair of the land sector portions and groove sector portions are shifted in location from each other in the circumferential direction thereof such that they do not overlap each other in the radial direction.

2. A rewritable disk-shaped optical recording medium as recited in claim 1, wherein, for each adjacent pair of the land sector portions and the groove sector portions, the locations of the rewriting area of one sector portion and the read-only area of the other sector portion are shifted in location from each other in the circumferential direction thereof such that they do not overlap each other in the radial direction.

3. A rewritable disk-shaped optical recording medium as recited in claim 1, wherein, for each adjacent pair of the land sector portions and the groove sector portions, the respective rewriting areas thereof are adjoined in parallel with each other.

4. A rewritable disk-shaped optical recording medium as recited in claim 3, wherein, for each adjacent pair of the land sector portions and the groove sector portions, the locations of the respective writing areas thereof correspond to each other in a lengthwise direction from a starting edge to an ending edge thereof in the circumferential direction, and wherein the respective read-only areas thereof neither correspond to nor are adjoined with each other in a lengthwise direction from a starting edge to an ending edge thereof in the circumferential direction.

5. A rewritable disk-shaped optical recording medium as recited in claim 1, wherein said pits of each of said read-only areas of said groove sector portions and said land sector portions constitute a pit string;
each of said writing areas of said groove sector portions and said land sector portions comprises a writing signal string; and
an interval between circumferentially adjacent pit strings in the read-only areas is approximately twice that of circumferentially adjacent writing signal strings in the rewriting areas.

6. A rewritable disk-shaped optical recording medium as recited in claim 1, wherein said track is a spiral track, and said turns thereof comprise a plurality of first turns and a plurality of second turns alternating contiguously with said first turns;
each of said first turns comprises a contiguous plurality of said groove sector portions; and
each of said second turns comprises a contiguous plurality of said land sector portions.

7. A rewritable disk-shaped optical recording medium as recited in claim 6, wherein each of said first turns of said spiral track is comprised of a plurality of discrete grooves.

8. A rewritable disk-shaped optical recording medium as recited in claim 7, wherein each of said groove sector portions comprises one of said plurality of discrete grooves.

9. A rewritable disk-shaped optical recording medium as recited in claim 7, wherein each of said plurality of grooves stores only a rewritable data signal corresponding to one sector in data amount.

10. A rewritable disk-shaped optical recording medium as recited in claim 6, wherein the number of said plurality of land sector portions contained in each of said second turns corresponds to the number of said plurality of groove sector portions contained in each of said first turns contiguous therewith.

11. A rewritable disk-shaped optical recording medium as recited in claim 6, further comprising:
a discrimination part comprising a pit for providing an indication of a junction between a circumferentially contiguous pair of said first and second turns.

12. A rewritable disk-shaped optical recording medium as recited in claim 11, wherein said discrimination part is located between the read-only area and the rewriting area, respectively, of a circumferentially contiguous pair of said groove sector portions and said land sector portions of said circumferentially contiguous pair of said first and second turns.

13. A rewritable disk-shaped optical recording medium as recited in claim 12, wherein said discrimination part is located circumferentially immediately before the groove area of one of said groove sector portions.

14. A rewritable disk-shaped optical recording medium as recited in claim 11, wherein said discrimination part is provided along a radial direction for providing indications of junctions between contiguous pairs of said first and second turns, respectively.

15. A rewritable disk-shaped optical recording medium as recited in claim 1, wherein said first pits of said first read-only areas and said second pits of said second read only areas have the same depths as said groove areas.

16. A rewritable disk-shaped optical recording medium as recited in claim 1, wherein the track pitch is within the range of 0.6 µm or more and 1.0 µm or lower.

17. A rewritable disk-shaped optical recording medium as recited in claim 1, wherein the numerical value defined by $A=Tp/(\lambda/NA)$ is set in the range of 0.4 to 0.7 wherein $\lambda$ is an optical source wavelength, NA is numerical aperture and Tp is track pitch.

18. A rewritable disk-shaped optical recording medium, comprising:
a track having a plurality of turns, each of which is divided into a plurality of sector portions;
wherein a first plurality of said sector portions comprises land sector portions and a second plurality of said sector portions comprises groove sector portions;
wherein said land sector portions and said groove sector portions are alternatingly provided along a radial direction;
wherein each of said groove sector portions comprises a groove area and a non-groove area, and each of said land sector portions comprises a land constituting a non-groove area;
wherein each of said land sector portions includes a first read-only area comprising first pits, and a first rewriting area for recording and reading of data;
wherein each of said groove sector portions includes a second read-only area comprising second pits, and a second rewriting area for recording and reading of data;
wherein said second read-only area of each of said groove section portions is formed in said non-groove area thereof;
wherein said first read-only area of each of said land sector portions is formed in said non-groove area thereof; and
wherein a discrimination part, comprising at least one pit, is provided to indicate junctions between circumferentially contiguous ones of said first and second turns.

19. A rewritable disk-shaped optical recording medium as recited in claim 1, wherein
said first pits of all of said groove sector portions are aligned along a radial direction; and
wherein said second pits of all of said land sector portions are aligned along a radial direction.

20. A rewritable disk-shaped optical recording medium as recited in claim 6, further comprising
a discrimination part, comprising at least one pit, for providing an indication of junctions respectively between circumferentially contiguous pairs of said first and second turns.

21. A rewritable disk-shaped optical recording medium as recited in claim 20, wherein
said discrimination part is elongated along a radial direction.

* * * * *

UNITED STATES PATENT AND TRADEMARK OFFICE
CERTIFICATE OF CORRECTION

PATENT NO.   : 5,724,338

DATED        : March 3, 1998

INVENTOR(S)  : Masahiro Birukawa, et al

It is certified that error appears in the above-identified patent and that said Letters Patent is hereby corrected as shown below:

On the Title Page, please add Item [*] Notice: The term of this patent shall not extend beyond the expiration date of Patent No. 5,422,874.

Signed and Sealed this

Eleventh Day of May, 1999

*Attest:*

Q. TODD DICKINSON

*Attesting Officer*    Acting Commissioner of Patents and Trademarks